United States Patent Office 3,344,478
Patented Oct. 3, 1967

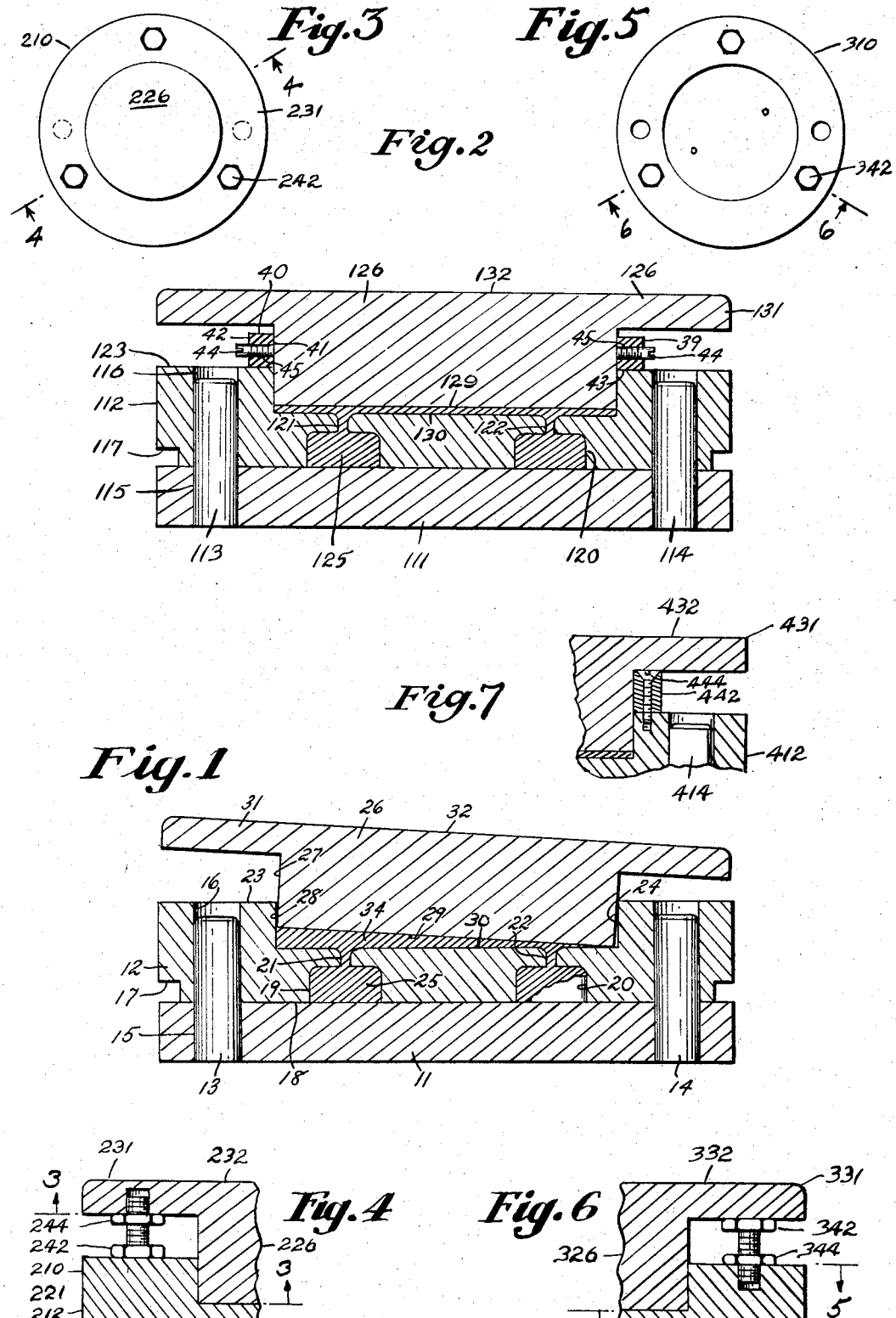

3,344,478
SELF-ALIGNING PISTON FOR TRANSFER
MOLDING MEANS
Milton Morse, 1 Horizon Road, Fort Lee, N.J. 07024
Filed Oct. 24, 1965, Ser. No. 504,930
4 Claims. (Cl. 18—42)

This invention relates generally to the field of transfer molding of synthetic resinous and other materials, and more particularly to an improved self-aligning piston or plunger used in connection therewith.

In transfer molding, a process widely used in the mass production of small molded parts, the molding means usually includes a cavity plate having an upwardly extending relatively large recess for retaining a quantity of the molding material therein, the recess communicating through sprues to a plurality of mold cavities in which the individual objects being molded are formed. The cavities normally extend into the cavity plate from a surface oppositely disposed to the recess, and rests upon a base plate, which closes the same during the molding process.

During the performing of the molding operation, the quantity of molding material disposed in the recess is forced through the sprues by the entry of a plunger or piston which substantially fills the recess and displaces the molding material. The recess usually is of cylindrical configuration, and the plunger of corresponding configuration. With continued use, wear normally increases clearances between the plunger and the recess to a point where a degree of rocking of the plunger with respect to the recess occurs. Then, when the plunger descends into the recess, the lowermost surface thereof does not remain in parallel relation with respect to the bottom surface of the recess, resulting in a failure to force substantially all of the molding material through the sprues and into the molding cavities. Where the molding material is relatively low in cost, this wear can be compensated for by merely using more of the molding material. However, many synthetic resinous materials are relatively high in cost, and where very small parts are molded, often the amount of material remaining in the sprues and the recess is greater than that employed in actually forming the molded parts. Thus, the percentage of waste material is so high as to materially increase the cost of production.

It is therefore among the principal objects of the present invention to provide an improved transfer molding piston or plunger which will at all times remain in accurate alignment with the recessing into which it is inserted, and be capable of forcing practically all of the molding material disposed in the recess into the cavities and the sprues of the cavity plate, thus reducing the degree of waste material with each molding operation to a minimum.

Another object of the invention lies in the provision of an improved transfer molding means possessed of the above advantage, which will operate in a manner similar to existing prior art devices.

A further object of the invention lies in the provision of an improved piston or plunger means for use with a transfer molding means which may be incorporated into existing prior art devices with little or no modification.

Still another object of the invention lies in the provision of a transfer molding means in which the piston or plunger member thereof is provided with means limiting the degree of ingress thereof into the transfer recess to the precise degree required to utilize as much of the molding material as possible.

These objects, as well as other incidental ends and advantages, will more fully appear in the progress of the following disclosure, and be pointed out in the appended claims.

In the drawing, to which reference will be made in the specification:

FIGURE 1 is a schematic view showing a transfer molding device known in the prior art, and illustrating the faulty operation of the same resulting from increased wear.

FIGURE 2 is a similar schematic view showing an embodiment of the present invention.

FIGURE 3 is a bottom plan view of the plunger in a second embodiment of the invention.

FIGURE 4 is an enlarged fragmentary sectional view of the plunger and the cavity plate of the second embodiment as seen from the plane 4—4 on FIGURE 3.

FIGURE 5 is a plan view of the cavity plate in the third embodiment of the invention.

FIGURE 6 is an enlarged fragmentary sectional view of the plunger and the cavity plate of the third embodiment as seen from the plane 6—6 on FIGURE 5.

FIGURE 7 is a sectional view like FIGURE 6 but shows a fourth embodiment.

As is known in the prior art, conventional transfer molding means, as exemplified in FIGURE 1, comprise broadly: a base plate 11, and a cavity plate 12 selectively positionable upon said base plate 11 in aligned relationship. Guide pins 13 and 14 extend through bores 15 in the base plate and bores 16 in the cavity plate, there being a force fit between the pins and one or the other of the plurality of bores 15–16 to facilitate engagement and removal at the completion of a molding cycle. If desired, the cavity plate 11 may be provided with an angular recess 17 to facilitate the manual grasping of the cavity plate 12 for lifting the same from contact with the base plate 11.

Extending upwardly from the lower surface 18 of the cavity plate 12 are a plurality of cavities 19 and 20 of a configuration corresponding to that of the article or parts to be molded, each cavity having a sprue, as at 21–22, communicating with a source of molding material.

Extending downwardly from the upper surface 23 of cavity plate 12 is a cylindrical recess 24 in which the molding material 25 is disposed such that when a plunger 26 is inserted therein, the molding material 25 will be forced from the recess 24 into the sprues 21–22.

The plunger 26 includes a cylindrical side wall surface corresponding to the side surface 28 of the recess 24, and a lower surface 29 corresponding to the bottom surface 30 of the recess 24. The outwardly extending flange 31 located at the upper part of the plunger 26 provides means for manually lifting the same from contact with the recess 24. The upper surface 32 is disposed beneath a hydraulic or other ram (not shown) which provides means for forcing the plunger 26 against the molding material 25, as is well-known in the art.

As seen in FIGURE 1, with continued use the fit between the plunger 26 and the recess 24 no longer remains accurate, and when pressure is applied to the upper surface 32 there is often a tendency for the plunger to cant to one side or another, resulting in the failure of the lower surface 29 to come into close proximity with the bottom surface 30. When this occurs, there is often insufficient molding material 25 forced through the sprues 21–22 to completely fill the cavities 19–20, so that not only are some of the finished molded articles improperly formed, but a large amount of wasted molding material, indicated by reference character 34, remains in the recess 24.

Referring to FIGURE 2, there is illustrated an embodiment of the present invention in which parts corresponding to those of the device illustrated in FIGURE 1 have been designated by similar reference characters with the additional prefix "1."

In accordance with the invention, the plunger 126 is provided with a ring 39 of generally rectangular cross section, bounded by an upper surface 40, an inner surface 41, an outer surface 42 and a lower surface 43. Extending through the body of the ring 39 from the outer surface 42 to the inner surface 41 are a plurality of set screws 44 which are disposed in correspondingly threaded bores 45.

The ring 39 is installed upon the plunger 126 beneath the flange 131 as indicated, and after careful alignment to assure that the principal plane of the same will remain parallel to that of the lower surface 129, the said screws 44 are tightened. Preferably the adjustment is such that the degree of maximum ingress of the plunger with respect to the recess is just sufficient to allow the minimum amount of molding material 125 to remain after the molding operation to permit convenient removal of the solidified material in the sprues 121–122. During the molding operation, contact of the lower surface 43 with the upper surface 123 of the cavity plate will automatically align the plunger 126 axially with respect to the axis of the recess 124, thus assuring the existence of a parallel condition between the surfaces 129 and 130. Thus, tolerances between the plunger and cavity need only be sufficiently close to prevent leakage of the molding material therebetween.

Turning now to the second embodiment shown in FIGURES 3 and 4, indicated generally by reference character 210, to avoid needless repetition, certain of the parts corresponding to the first embodiment are given the same reference characters with the addition of the prefix "2."

The second embodiment differs from the first embodiment in the provision of other adjustable means in the form of a plurality of set screws 242 to limit the ingress of the plunger 226 into the cavity plate 212. The set screws are threadedly engaged in the flange 231 and are maintained in adjusted positions thereof by the lock nuts 244.

In the third embodiment, illustrated in FIGURES 5 and 6, here again certain parts are given the same reference characters as the first embodiment with the addition of the prefix "3."

In the third embodiment, the adjustable means is in the form of set screws 342 which limit ingress of the plunger 326 into the cavity plate 312. The set screws are threadedly engaged in the cavity plate 312 and are maintained in adjusted positions thereof by the lock nuts 342.

In the fourth embodiment, again certain parts have the same reference characters as the first embodiment, but have a prefix "4."

In this embodiment there is an annular ring 442 which limits ingress of the plunger. The ring is maintained in position by the screws 444 which engage the plate 412.

I wish it to be understood that I do not consider the invention limited to the precise details of structure shown and set forth in this specification, for obvious modifications will occur to those skilled in the art to which the invention pertains.

I claim:

1. In a transfer molding device including a cavity plate having an upwardly disposed recess, a plurality of molding cavities and a plurality of sprues interconnecting said recess in said cavities, and a plunger having a portion corresponding in configuration to said recess selectively insertable thereinto, the improvement comprising: a ring means positioned upon and surrounding said last-mentioned portion for controlling the degree of ingress of said portion into said recess, and axially aligning the principal axis of said portion with respect to that of said recess upon such ingress.

2. Structure in accordance with claim 1 in which said ring means is adjustably positioned upon said last-mentioned portion.

3. Structure in accordance with claim 1 in which said ring means is provided with set screw means for said plunger.

4. Structure in accordance with claim 1 in which said ring means is of rectangular cross section.

References Cited

UNITED STATES PATENTS

| | | | |
|---|---|---|---|
| 2,807,564 | 9/1957 | Mitchell | 18—42 X |
| 2,883,704 | 4/1959 | Jurgeleit | 18—42 X |
| 2,900,663 | 8/1959 | Linhorst | 18—42 |
| 2,949,635 | 8/1960 | Chiero | 18—42 X |
| 3,145,423 | 8/1964 | Horvereid | 18—42 |
| 3,196,485 | 7/1965 | Battenfeld et al. | 18—42 X |

J. SPENCER OVERHOLSER, *Primary Examiner.*

J. HOWARD FLINT, Jr., *Examiner.*